D. S. McBRYDE.
Fish-Traps.

No. 198,894.  Patented Jan. 1, 1878.

WITNESSES
Villette Anderson
F. J. Mass

INVENTOR
Daniel S. McBryde,
by E. W. Anderson,
ATTORNEY

UNITED STATES PATENT OFFICE.

DANIEL S. McBRYDE, OF GOOD HOPE, MISSISSIPPI.

IMPROVEMENT IN FISH-TRAPS.

Specification forming part of Letters Patent No. 198,894, dated January 1, 1878; application filed June 30, 1877.

*To all whom it may concern:*

Be it known that I, D. S. McBRYDE, of Good Hope, in the county of Leake and State of Mississippi, have invented a new and valuable Improvement in Fish-Traps; and I do hereby declare that the following is a full, clear, and exact description of the construction and operation of the same, reference being had to the annexed drawings, making a part of this specification, and to the letters and figures of reference marked thereon.

Figure 1:
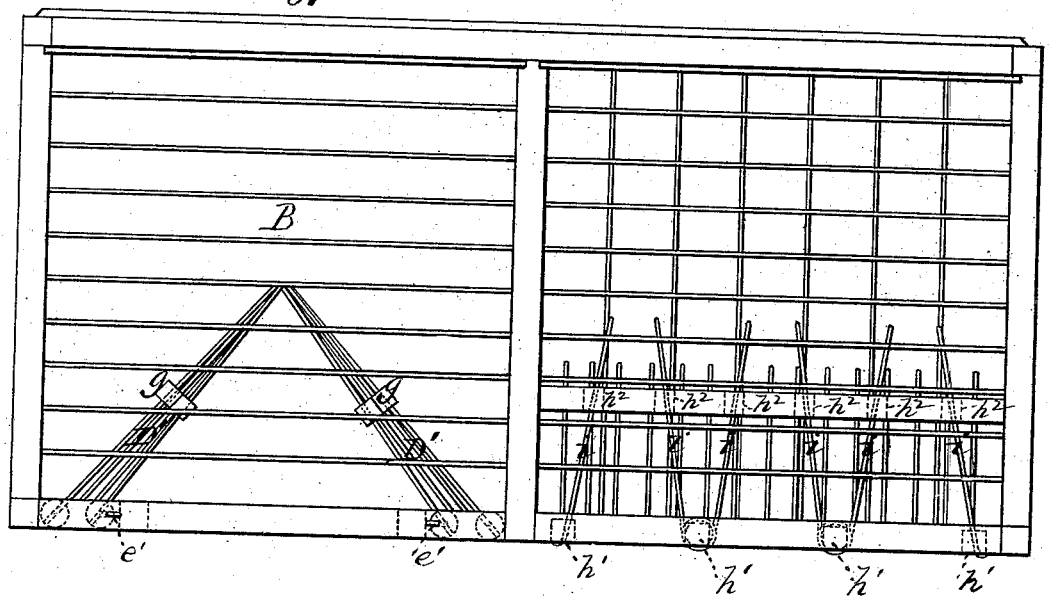
Figure 2:
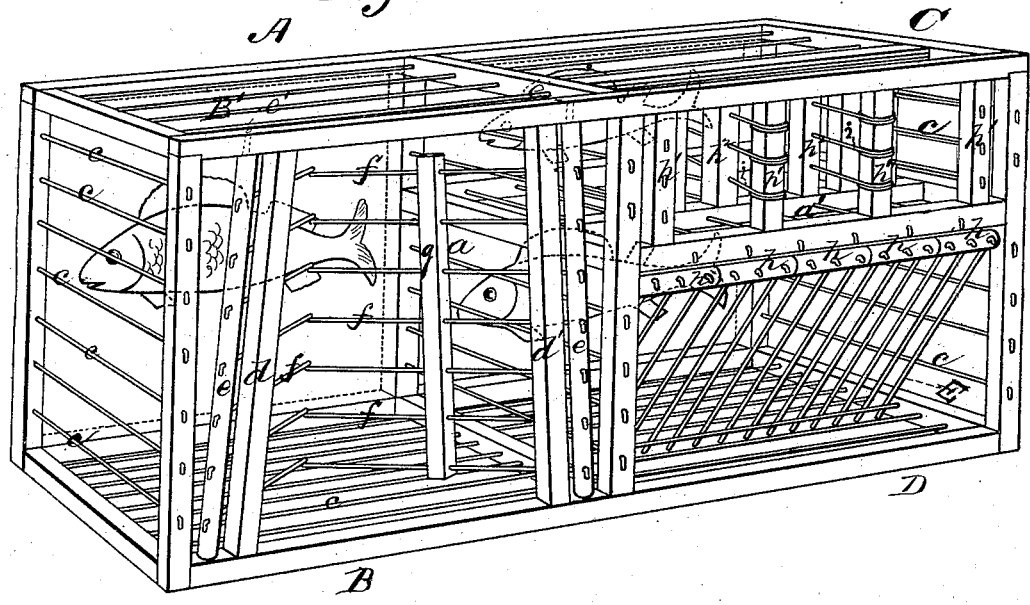

Figure 1 of the drawings is a representation of a top view of my improved trap, and Fig. 2 is a perspective view thereof.

This invention has relation to improvements in traps for the capture of fish, ducks, and other aquatic creatures.

The nature of my invention will be fully understood from the following description, and set forth in the claims.

In the annexed drawings, the letter A designates my improved trap, divided by a central partition, $a$, into two equal parts, one of which may be still further divided by a horizontal partition, $a'$, into an upper and lower section, lettered C D, respectively, in the drawings. The general form of the trap-body A will be rectangular, and its sides, top, and bottom will be formed of suitable frames, having suitably-spaced wires $c$ stretched across them. The larger division B of the trap, intended especially for capturing the larger fish, will have at its front end two spaced jambs, $d\,d'$, arranged in an inclined position, as shown, between which and the side posts of the trap will be arranged the journal upon which the door turns. This consists of a tubular part, $e$, and a preferably metallic post, $e'$, arranged in an inclined position. The inclination of the posts at each side of the opening is toward each other. The gates or doors D' are composed of a suitable number of wires, $f$, arranged at a suitable distance apart, secured at one end to the tube aforesaid, and braced by a rod or plate, $g$. The gates being in an inclined position, they naturally swing outward toward each other, and the ends of the wires interlock, so as to completely close the opening. In this position the said gates abut against the jambs, which thus serve as stops.

The fish, on entering the trap, readily swings the doors back; but after he has passed beyond them they swing to, and automatically close the opening, thus holding the said fish.

In order to tempt the fish to the trap, a suitable bait will be suspended from a wire within it, or buried in a grooved board covered with transparent glass.

B' represents a reflecting mirror arranged at the back of the trap, so that a fish, on approaching the mirror, may see his own image reflected, and will the more readily enter the same. This mirror may have the representation of a fish or fishes painted or otherwise placed thereon, as shown in Fig. 2. The division-wall $a'$ of the section C D is made up of spaced wire, between which the smaller fish may pass upward and escape from the larger ones below, thus avoiding being devoured.

The door E of the lower section D is composed of a number of small sections, of substantially the same construction as the doors D' above described, and are hinged to the lower trap's front by means of a journal-rod, extending through their tubular bearings $h$ in a preferably horizontal direction. The ends of this rod are secured to the side walls of the trap, and as the sections vibrate independently of each other thereon, a fish or other aquatic creature may raise one of the said sections, and pass into the trap without disturbing the remainder. The effect of this is to confine all the fish previously captured, as no means of egress is afforded. The upper section C may also have a gate of this description; but I sometimes use gateways of the following construction: The front of the section is provided with spaced posts $h^1$, and in rear of these are arranged, in pairs, a second series of posts, $h^2$, at a less distance apart. The front and rear posts are connected by spaced converging wires $i$, that nearly meet at their rear ends. The fish, on passing between the posts $h^1$, are directed by the wires $i$ between the posts $h^2$, and pass into the trap through the space at the rear end of said wires, whence they are prevented from escaping by the points or ends thereof.

What I claim as new, and desire to secure by Letters Patent, is—

1. The fish-trap herein described, having swinging automatically-closing gates, and a reflecting mirror opposite thereto, serving as a decoy, substantially as specified.

2. The combination, with a fish-crate trap, of the swinging gravitating doors, the jambs $d\ d'$, and braces $g$, arranged substantially as described, and for the purpose set forth.

In testimony that I claim the above I have hereunto subscribed my name in the presence of two witnesses.

DANIEL SIDNEY McBRYDE.

Witnesses:
A. M. McBRYDE,
J. H. MORRIS.